United States Patent
Martin et al.

(10) Patent No.: US 8,150,024 B1
(45) Date of Patent: Apr. 3, 2012

(54) METHODS AND SYSTEMS FOR SETTING A VOLUME LEVEL OF RINGBACK MEDIA PRESENTED TO A CALLING PARTY

(75) Inventors: Geoffrey S. Martin, Overland Park, KS (US); Jonathan R. Kindred, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1240 days.

(21) Appl. No.: 11/852,588

(22) Filed: Sep. 10, 2007

(51) Int. Cl.
*H04M 1/00* (2006.01)

(52) U.S. Cl. ............ 379/373.01; 379/88.16; 379/22.08; 379/392.01

(58) Field of Classification Search ............ 379/373.01, 379/68, 88.16, 88.22, 31, 22.08, 392.01
See application file for complete search history.

(56) References Cited

U.S. PATENT DOCUMENTS

| | | | |
|---|---|---|---|
| 5,233,641 A * | 8/1993 | Maeda | 455/567 |
| 6,049,700 A | 4/2000 | Hardouin | |
| 6,122,366 A * | 9/2000 | Veschi | 379/373.02 |
| 6,298,247 B1 | 10/2001 | Alperovich et al. | |
| 6,985,559 B2 * | 1/2006 | Hardy | 379/1.02 |
| 7,023,984 B1 | 4/2006 | Short et al. | |
| 7,142,678 B2 | 11/2006 | Falcon | |
| 7,333,604 B2 * | 2/2008 | Zernovizky et al. | 379/392.01 |
| 7,428,302 B2 * | 9/2008 | Zirngibl et al. | 379/88.12 |
| 7,490,042 B2 * | 2/2009 | Eide et al. | 704/270 |
| 8,036,391 B2 * | 10/2011 | Cronin | 381/57 |
| 2002/0076033 A1 * | 6/2002 | Baweja et al. | 379/373.01 |
| 2007/0189488 A1 * | 8/2007 | Stoops | 379/207.16 |

FOREIGN PATENT DOCUMENTS

WO    WO 98/15068    4/1998

OTHER PUBLICATIONS

Qualcomm, "PureVoice Audio Automatic Gain Control™," http://www.cdmatech.com/about/us/contact.jsp, 2004.
Nokia 6250, #NOK6250—MobilePlanet, http://www.jobileplanet.com/p.aspx?l=101123, printed from the World Wide Web on May 24, 2007.

* cited by examiner

*Primary Examiner* — Olisa Anwah

(57) ABSTRACT

Methods and systems are disclosed for setting a volume level of ringback media presented to a calling party. The method may include receiving at a ringback server an indication of ambient noise at a client device, using the received indication as a basis to set a volume level of the ringback media, and transmitting the ringback media at the volume level, for receipt by the client device.

17 Claims, 5 Drawing Sheets

METHODS AND SYSTEMS FOR SETTING A VOLUME LEVEL OF RINGBACK MEDIA PRESENTED TO A CALLING PARTY

FIELD OF THE INVENTION

The present invention relates to presenting media content to a calling party and, more particularly, to setting a volume level of ringback media presented to a calling party.

BACKGROUND

In a traditional telephone network, ringback media is typically an audible tone sequence presented during a call process to a caller. The ringback media may signal to the caller that the called party's phone is being alerted of an incoming call from the caller to the called party. Upon hearing ringback media, the caller may generally assume that the called party is receiving a corresponding, concurrent (or nearly concurrent) alert, such as an audible ringtone sequence. The ringback media usually continues until either the called party (or a call-handling function such as an answering machine) answers the call or the caller hangs up before the call is answered. The period within the call process during which ringback media is played is typically referred to as the ringback period.

The model for ringback media has evolved similarly in both circuit-switched telephony with out-of-band signaling and services (Signaling System 7 (SS7) and Advanced Intelligent Network (AIN), for example), and packet-based telephony, such as Voice over Internet Protocol (VoIP). Ringback media in these types of systems is typically stored as an audio data file on a network entity such as a ringback server, and played out to a caller's phone during the call process when the entity receives a signal, from a terminating switch for example, indicating that the called party's phone is being alerted.

SUMMARY

Typically, ringback media is presented to a calling party at a baseline volume level. However, the baseline volume level of the ringback media may not always be a desirable level. For instance, when the calling party is in an environment with relatively high ambient noise, the baseline volume level of the ringback media may be too low for the calling party to hear and/or understand the ringback media. In such a circumstance, the calling party may incorrectly assume that the call did not go through to the called party or went straight to voicemail, as examples. As another example, the calling party may be in an environment with relatively low ambient noise (e.g., a library), and the baseline volume level of the ringback media may too high such that those in close proximity to the calling party may hear and thus be disturbed by the ringback media.

Methods and systems are disclosed for setting a volume level of ringback media presented to a calling party. In operation, a user of a client device ("calling party") may place a call to a subscriber of ringback media (or media content, more generally) or the calling party may subscribe to receive ringback media. At some point during or even before the call process, the client device may detect ambient noise in its surrounding environment. Upon detecting the ambient noise, the client device may transmit an indication of the ambient noise, for receipt by a ringback server (or server, more generally) for instance. And upon receiving the indication of the ambient noise, the ringback server may use the received indication as a basis to set a volume level of the ringback media to be delivered to the calling party.

If, for example, the ambient noise at the client device is at a relatively high level (e.g., the calling party is in a concert hall with music playing throughout), then the ringback server may accordingly increase the volume level of the ringback media or set the volume level of the ringback media to a relatively high level. Preferably, the ringback media is presented at a volume level that is audible to the user in the environment with relatively high ambient noise. On the other hand, if the ambient noise is at a relatively low level (e.g., the calling party is in a library or other relatively quiet environment), then the ringback server may accordingly decrease the volume of the ringback media or set the volume level of the ringback media to a relatively low level. Preferably, the ringback media is presented at a volume level that is appropriate for the user in the relatively quiet environment.

In one aspect, an embodiment of the present invention may take the form of a method. In a server that transmits media content to a client device, the method includes receiving at the server an indication of ambient noise at the client device, using the received indication as a basis to set a volume level of the media content, and transmitting the media content at the volume level, for receipt by the client device.

Preferably, the server includes a ringback server, and the media content includes ringback media. In one example, receiving the indication of the ambient noise includes receiving a numerical value corresponding to the ambient noise, and using the received indication as a basis to set the volume level includes using the numerical value as a basis to set the volume level.

Generally, a call placed by the client device may include a call-setup period and ringback period. In one instance, receiving the indication of the ambient noise includes receiving the indication during the call-setup period, and transmitting the media content includes transmitting the media content during the ringback period. In some instances, setting the volume level of the media content includes setting the volume level during the call-setup period. In other instances, setting the volume level of the media content includes setting the volume level during the ringback period.

In an example, using the received indication as a basis to set the volume level of the media content includes using correlation data to correlate the indication of the ambient noise to the volume level, thereby determining the volume level for the media content. In other examples, using the received indication as a basis to set the volume level further includes setting the volume level of the media content to the determined volume level.

In one instance, setting the volume level of the media content includes setting an amplitude level of the media content. In another instance, setting the volume level of the media content includes adjusting an amplitude level of the media content.

In another aspect, an embodiment of the present invention may take the form of a server. The server includes a communication interface, a processor, and data storage containing (i) media content and (ii) instructions executable by the processor to receive an indication of ambient noise at a client device, use the received indication as a basis to set a volume level of the media content, and transmit the media content at the volume level via the communication interface, for receipt by the client device.

In one example, the instructions to receive the indication of the ambient noise include instructions to receive a numerical value corresponding to the ambient noise, and the instructions to use the received indication as a basis to set the volume level include instructions to use the numerical value as a basis to set the volume level.

In one instance, the instructions to receive the indication of the ambient noise include instructions to receive the indication during the call-setup period, and the instructions to transmit the media content at the volume level include instructions to transmit the media content during the ringback period. In some instances, the instructions to set the volume level of the media content include instructions to set the volume level of the media content during the call-setup period. In other instances, the instructions to set the volume level of the media content include instructions to set the volume level of the media content during the ringback period.

In some cases, the data storage contains correlation data, and the instructions to use the received indication as a basis to set the volume level of the media content include instructions to use the correlation data to correlate the indication of the ambient noise to the volume level.

In one example, the instructions to set the volume level of the media content include instructions to set an amplitude level of the media content. In another example, the instructions to set the volume level of the media content include instructions to adjust an amplitude level of the media content.

In yet another aspect, an embodiment of the present invention may take the form of a system. The system includes a client device and a ringback server. The client device is preferably arranged to (i) detect ambient noise, and (ii) transmit an indication of the ambient noise, for receipt by the ringback server. And the ringback server is preferably arranged to (i) receive the indication of the ambient noise, (ii) use the received indication as a basis to set a volume level of ringback media, and (iii) transmit the ringback media at the volume level, for receipt by the client device.

These as well as other aspects and advantages will become apparent to those of ordinary skill in the art by reading the following detailed description, with appropriate reference to the accompanying drawings.

BRIEF DESCRIPTION OF THE DRAWINGS

Various embodiments are described herein with reference to the following drawings, wherein like numerals denote like entities.

DETAILED DESCRIPTION

1. System Architecture

Figure 1:
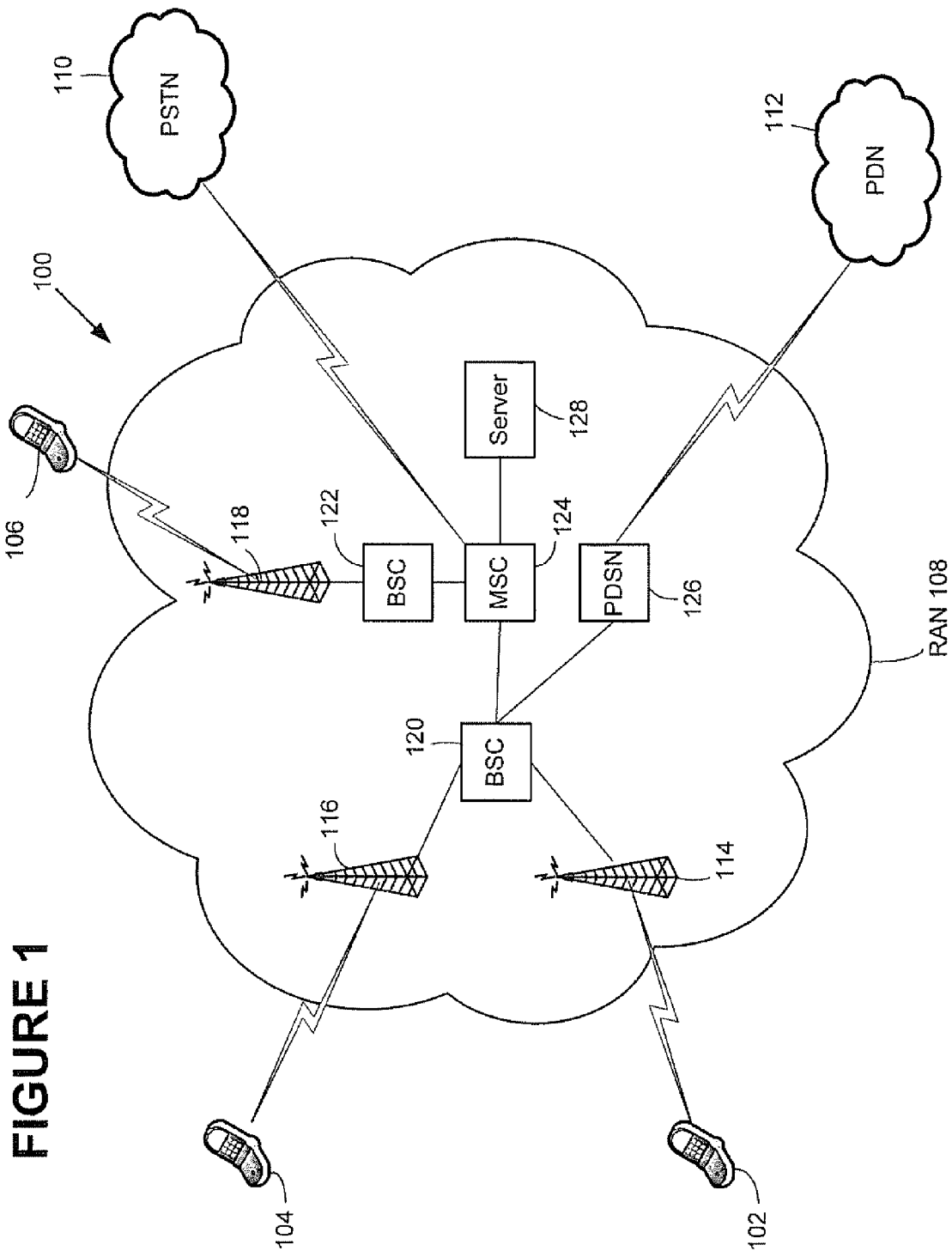
FIG. 1 is a block diagram of a communications system for use in carrying out an embodiment of the present invention.

FIG. 1 is a block diagram of a communications system 100 for use in carrying out an embodiment of the present invention. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. And various functions may be carried out by a processor executing instructions stored in memory.

As shown in FIG. 1, the communications system 100 includes client devices 102, 104, and 106, a radio access network (RAN) 108, a public switched telephone network (PSTN) 110, and a packet-data network (PDN) 112.

The RAN 108 and each of the client devices 102, 104, and 106 may operate according to any wireless communication protocol now known or later developed, examples of which include without limitation CDMA (e.g., CDMA2000, EV-DO), iDEN, TDMA, AMPS, GSM, GPRS, UMTS, EDGE, WiMAX (e.g., IEEE 802.16), LTE, microwave, millimeter wave, satellite, MMDS, Wi-Fi (e.g., IEEE 802.11), Bluetooth, and infrared.

Generally speaking, each of the client devices 102, 104, and 106 may be any wireless communication device that is capable of wirelessly communicating with the RAN 108. The term "client device" designates any such wireless communication device, regardless of whether the device is currently or permanently situated in a fixed position (e.g., attached to a wall or desk), and regardless of whether the device is easily movable (e.g., handheld or pocket-sized) or battery-operated. As examples, any of the client devices 102, 104, and 106 could be or include a mobile phone, a PDA, a computer, a laptop computer, a hybrid CDMA/EV-DO device, and/or a multi-mode cellular/Wi-Fi device.

The RAN 108, in turn, may be any wireless serving network that is capable of communicating over an air interface with one or more client devices. As such, the RAN 108 will include one or more antennas, one or more transceivers, and associated control logic for engaging in air interface communication with client devices according to any agreed air interface protocol.

The RAN 108 may provide connectivity with one or more transport networks and may include logic to set up and carry communications between served client devices and entities on the transport network(s). In particular, the RAN 108 may include a network interface and may include program logic arranged to detect a communication (e.g., a signaling message or bearer traffic) arriving via the network interface and ultimately establish a communication path over the air to the client device.

Likewise, the RAN 108 may enable the served client devices to communicate with each other. For instance, the RAN 108 may include a switch, bridge, or router function and associated logic arranged to detect a communication arriving over the air from one served client device and destined to another client device, and ultimately establish a communication path between the client devices via the RAN 108.

Without limitation, FIG. 1 depicts an example configuration of RAN 108. As shown, the RAN 108 includes base transceiver stations (BTSs) 114, 116, and 118, base station controllers (BSCs) 120 and 122, a mobile switching center (MSC) 124, a packet data serving node (PDSN) 126, and a ringback server 128. Of course, additional entities could be present, such as additional client devices in communication with BTSs 114, 116, and 118, additional BTSs in communication with BSCs 120 and 122, additional BSCs in communication with MSC 124 and/or PDSN 126, and additional ringback servers in communication with MSC 124 and/or PDSN 126. And some entities may be omitted altogether.

As shown in FIG. 1, the RAN 108 is communicatively coupled to each of the PSTN 110 and PDN 112. In particular, the MSC 124 is communicatively coupled to the PSTN 110 and the PDSN 126 is communicatively coupled to the PDN 112. Of course, there could be additional entities in communication with the PSTN 110 and/or PDN 112. And there could be one or more devices and/or networks making up at least part of one or more of the communication links between the MSC 124 and PSTN 110 and/or PDSN 126 and PDN 112. For example, there could be one or more routers, switches, other devices, or other networks on the link between MSC 124 and PSTN 110 and/or PDSN 126 and PDN 112. Further, PSTN 110 and PDN 112 may be connected via one or more gateways and/or other devices. Of course, other variations and/or additions are possible as well.

Each of the BTSs 114, 116, and 118 may be any network element arranged to early out the BTS functions described herein. As such, each of the BTSs 114, 116, and 118 may include a communication interface, a processor, and data storage containing instructions executable by the processor to carry out those BTS functions. Each of the communication interfaces may include one or more antennas, chipsets, and/or other components for providing one or more coverage areas such as cells and sectors, for communicating with client devices over an air interface. Each of the communication interfaces may also include one or more wired (e.g., a wired Ethernet interface) and/or wireless interfaces for communicating with at least one of BSCs 120 and 122.

Each of the BSCs 120 and 122 may be any network element arranged to carry out the BSC functions described herein. As such, each of the BSCs 120 and 122 may include a communication interface, a processor, and data storage containing instructions executable by the processor to carry out those BSC functions. Each of the communication interfaces may include one or more wired and/or wireless interfaces for communicating with at least one of BTSs 114, 116, and 118, MSC 124, and PDSN 126. In general, each of the BSCs 120 and 122 functions to control one or more BTSs and to provide one or more BTSs with connections to devices such as MSC 124 and/or PDSN 126. For instance, each of the BSCs 120 and 122 may manage handoff of client devices moving between BTS coverage areas and schedule air interface transmissions of data or other bearer or control traffic via BTSs to or from various client devices. Further, depending on the wireless protocol used, aspects of one or more of the BSCs 120 and 122 and one or more of the BTSs 114, 116, and 118 may be combined together or distributed in other ways, generally defining one or more base station systems.

The MSC 124 may be any networking element arranged to carry out the MSC functions described herein. As such, the MSC 124 may include a communication interface, a processor, and data storage containing instructions executable by the processor to carry out those MSC functions. The communication interface may include one or more wired and/or wireless interfaces for communicating with at least BSCs 120 and 122, ringback server 128, and PSTN 110. In general, the MSC 124 functions as a switching element between the PSTN 110, which may be the well-known public switched telephone network, and one or more BSCs, thereby facilitating communication between client devices, such as the client device 102, 104, and 106, and the PSTN 110.

The PDSN 126 may be any networking element arranged to carry out the PDSN functions described herein. As such, the PDSN 126 may include a communication interface, a processor, and data storage containing instructions executable by the processor for carrying out those PDSN functions. The communication interface may include one or more wired and/or wireless interfaces for communicating with at least BSC 120 and PDN 112. In general, the PDSN 126 functions as a network access server between PDN 112 and BSCs such as BSC 120, thereby facilitating packet-data communication between client devices, such as client device 102 and 104, and the PDN 112.

The PDN 112 may include one or more wide area networks, one or more local area networks, one or more public networks such as the Internet, one or more private networks, one or more wired networks, one or more wireless networks, and/or one or more networks of any other type. Devices in communication with the PDN 112 may exchange data using a packet-switched protocol such as the Internet Protocol (IP), and may be identified by an address such as an IP address.

The ringback server 128 may be any networking element arranged to carry out the ringback-server functions described herein. As examples, the ringback server 128 may be a standalone server, may be integrated with one or more other servers, databases, and/or other network entities, may include one or more discrete servers, or may otherwise be distributed in other ways. Further, the ringback server 128 may be owned and operated by a carrier, content provider, or other entity that provides ringback media.

As shown in FIG. 1, the ringback server 128 is in communication with and thus accessible via the MSC 124. Additionally or alternatively, the ringback server 128 may be in communication with and thus accessible via at least one of the PDSN 126, PSTN 110, and PDN 112. In one of various possible embodiments, the ringback server 128 may function to receive one or more requests from the MSC 124 to (i) establish a communication session between the MSC 124 and ringback server 128, (ii) establish a ringback session between the ringback server 128 and one or more client devices indicated in one or more requests, and (iii) play/transmit in the ringback session particular ringback media indicated in the one or more requests. Of course, other examples exist for the ringback server 128.

2. Exemplary Ringback Server

Figure 2:
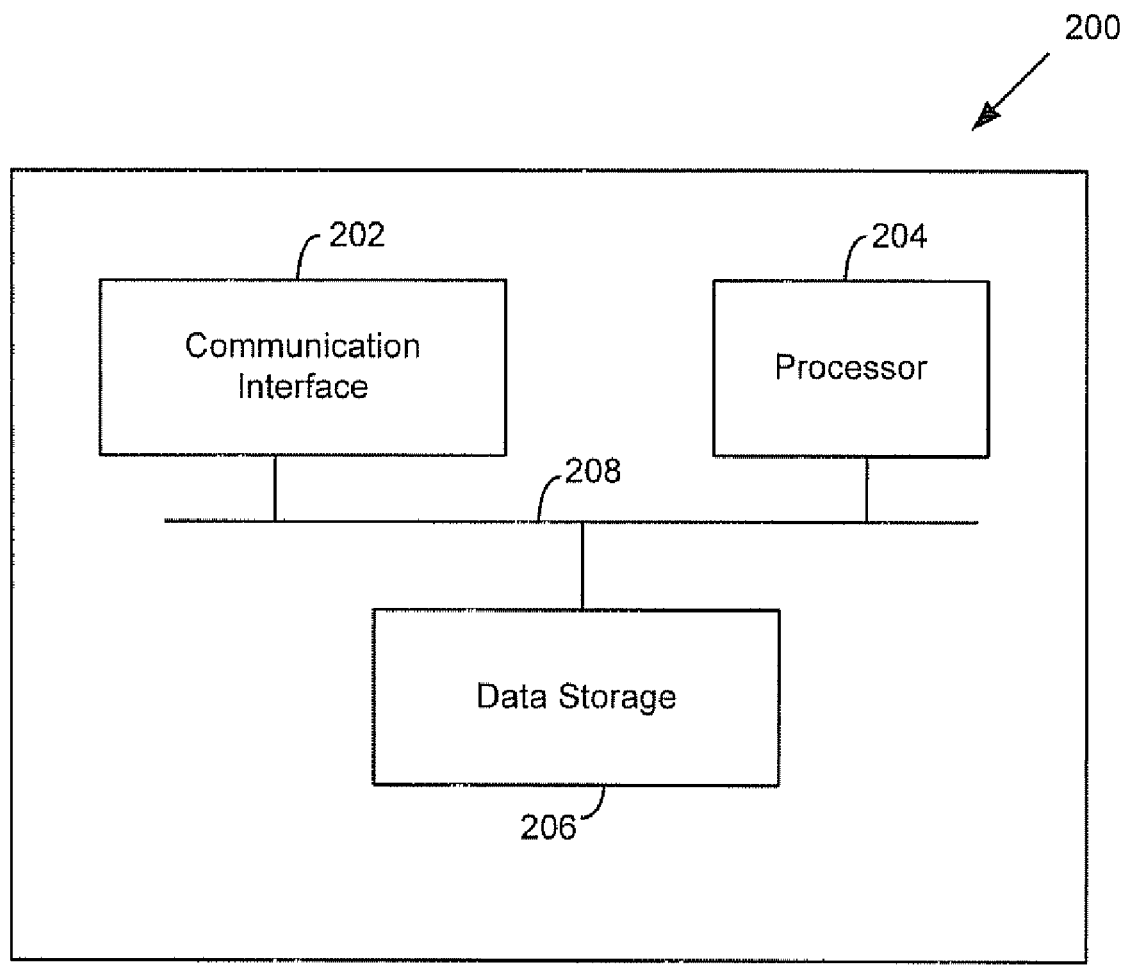
FIG. 2 is a block diagram of a ringback server for use in carrying out an embodiment of the present invention.

FIG. 2 is a block diagram of a ringback server 200 for use in carrying out an embodiment of the present invention. The ringback server 200 may be arranged as the ringback server 128 shown in FIG. 1. As depicted in FIG. 2, the ringback server 200 includes a communication interface 202, a processor 204, and data storage 206, all linked together via a system bus, network, or other connection mechanism 208.

The communication interface 202 provides an interface for communications between one or more network entities and other portions of the ringback server 200. Via the communication interface 202, for instance, the ringback server 200 may establish a communication session with the MSC 124 and a ringback session with one or more client devices. Of course, the ringback server 200 may communicate with network entities that are not shown in FIG. 1.

The processor 204 may include one or more processors (e.g., one or more general-purpose processors and/or one or more specialized processors). The processor 204 is arranged to carry out functions described herein, and may do so by executing computer-readable program instructions stored in data storage 206 and/or in firmware. In response to executing the program instructions, the processor 204 may interact with the communication interface 202 and/or the connection mechanism 208 to carry out functions described herein.

Data storage 206 may take any of a variety of configurations. For example, data storage 206 may include a computer-readable medium. The computer-readable medium may include volatile and/or non-volatile storage components, such as optical, magnetic, organic, flash, or other memory or disc storage. The computer-readable medium of data storage 206 may be integrated in whole or in part with the processor 204.

Further, data storage 206 may store various types of data. For instance, data storable in data storage 206 may be arranged as program instructions executable by the processor 204. As examples, program instructions executable by the processor 204 may include instructions to: (i) receive an indication of ambient noise at a client device, (ii) use the received indication as a basis to set a volume level of ringback media, and (iii) transmit the ringback media at the volume level via the communication interface 202, for receipt by the client device. Of course, other examples of program instructions stored in data storage 206 executable by processor 204 are also possible.

As another example, data storage 206 may store reference data. The reference data may include ringback media, data indicating that a particular client device is a subscriber to ringback service, ringback-matching information that may be used to select particular ringback media to present to a calling party, and correlation data that correlates indications of ambient noise to corresponding volume levels. Of course, data storage 206 may store other types of data as well.

3. Exemplary Client Device

Figure 3:
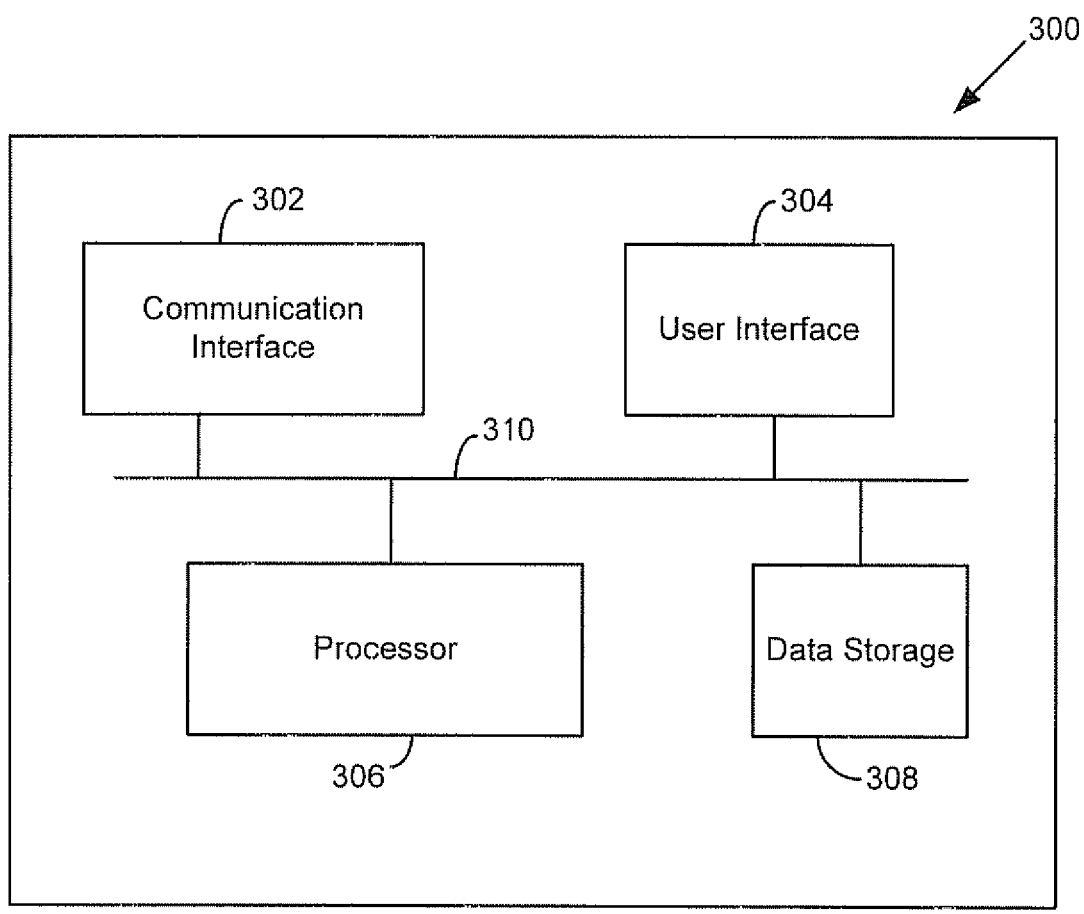
FIG. 3 is a block diagram of a client device for use in carrying out an embodiment of the present invention.

FIG. 3 is a block diagram of a client device 300 for use in carrying out an embodiment of the present invention. Any one of the client devices 102, 104, and 106 may be arranged as the client device 300. As shown in FIG. 3, the client device 300 includes a communication interface 302, user interface 304, processor 306, and data storage 308, all linked together via a system bus, network, or other connection mechanism 310.

The communication interface 302 provides an interface for communications between one or more network entities and other portions of the client device 300. In particular, the communication interface 302 may provide means to communicate over the RAN 108, and in turn, communicate with the ringback server 128. Of course, the client device 300 may communicate with network entities that are not shown in FIG. 1.

The user interface 304 may take any of a variety of configurations. As examples, the user interface 304 may include a keypad, touch-screen, and/or any other elements for receiving inputs, as well as a speaker, one or more displays, and/or any other elements for communicating outputs. In particular, the user interface 304 may include a microphone (or any other element arranged to detect sound vibrations) that is operable to detect ambient noise. Of course, other examples exist for the user interface 304.

The processor 306 may include one or more processors (e.g., one or more general-purpose processors and/or one or more specialized processors). The processor 306 is arranged to carry out functions described herein, and may do so by executing computer-readable program instructions stored in data storage 308 and/or in firmware. In response to executing the program instructions, the processor 306 may interact with communication interface 302, user interface 304, and/or connection mechanism 310 so as to carry out functions described herein.

Data storage 308 may take any of a variety of configurations. For example, data storage 308 may include a computer-readable medium. The computer-readable medium may include volatile and/or non-volatile storage components, such as optical, magnetic, organic, flash, or other memory or disc storage. The computer-readable medium of data storage 308 may be integrated in whole or in part with the processor 302.

Further, data storage 308 may store various types of data. For instance, data storable in data storage 308 may be arranged as program instructions executable by the processor 306. As examples, program instructions executable by the processor 306 may include instructions to: (i) detect ambient noise, (ii) assign a value or indication to the ambient noise, (iii) transmit the indication of the ambient noise, for receipt by the MSC 124 and/or ringback server 128, (iii) and present ringback media at a volume level set by the ringback server 128. Of course, other examples of program instructions stored in data storage 308 executable by processor 306 are also possible.

As another example, data storage 308 may store reference data. The reference data may include data used to correlate ambient-noise levels with other values or indications. Of course, data storage 206 may store other types of data as well.

4. Example of a Call Process Implementing Ringback Service

The following description illustrates a call process that implements ringback service. It should be understood that the following description is provided by way of example, and some of the steps described herein may occur at substantially the same time, be rearranged, substituted, and/or otherwise omitted. Further, the following call process applies to communications between the client devices 102 and 106, with the MSC 124 mediating the call. But the call process may apply to communications between other client devices (or devices, more generally), with other network entities mediating the call. For example, the devices may include landline devices, and the PSTN 114 may mediate the call. As another example, the devices may include SIP or H.323 devices, and the PDSN 130 may mediate the call. Of course, other examples and combinations of devices and network entities are also possible.

In the following, the call process is divided into a call-setup period and a ringback period. The "call-setup period" may refer to the period in which call routing is validated, calling preferences are obtained, and other such processes occur. The "ringback period" may refer to the period when the ringback media is transmitted (or played out) to the calling party. Of course, the transition between the call-setup and ringback periods may occur at other points as well.

In this example, a user of client device 102 ("calling party") wishes to call and either speak to or leave a voicemail message for a user of client device 106 ("called party"). In operation, the calling party may enter into the client device 102 a phone number corresponding to the client device 106 and initiate a call by pressing a "send" button, as an example; the client device 102 may then responsively send a call request to the MSC 124. The call request may include various types of information, such as the entered phone number corresponding to the client device 106 and the identity of the calling party (e.g., phone serial number). Further, when the client device 102 sends the call request, the call-setup period for the call process may begin. Of course, the call-setup period may begin at other points, such as when the calling party initiates the call or after the MSC 124 receives the call request.

After receiving the call request, MSC 124 may then authorize the call and query a location server (not shown) or network registration agent (not shown) to determine the location of the called client device 106. The location information for the client device 106 may enable the MSC 124 to determine call-routing information for the client device 106. At approximately the same time, the MSC 124 may request account information relating to the client device 106, perhaps from a database (not shown) containing subscriber account and profile information. The MSC 124 may use this information to process the call.

The account information may include a variety of data. As examples, the account information may include authorizations and call-handling preferences for the client device 106. Preferably, the account information includes an indicator that the client device 106 is a subscriber to ringback service, and also includes ringback-matching information that may be used to select particular ringback media to present to the calling party.

At this point (i.e., during the call-setup period), the MSC 124 may establish a communication session between the MSC 124 and ringback server 128. Additionally or alternatively, the MSC 124 may establish a ringback session between the ringback server 128 and client device 102. Of course, the MSC 124 may establish the communication session and/or ringback session at other points in the call process, such as earlier or later in the call-setup period, or just before the ringback period begins (i.e., just before actual transmission of the ringback media), as examples.

The MSC 124 may then send one or more call-setup messages to place a call to the client device 106, ultimately causing the client device 106 to ring (or output some form of ringtone media). As examples, call-setup messages may include a call request, an alerting signal, and caller ID of the calling party. Assuming the client device 106 is not busy, the MSC 124 may receive one or more messages indicating that ringing is in progress.

Perhaps after receiving one or more messages indicating that ringing is in progress, the MSC 124 may then signal to the ringback server 128 to transmit the ringback media. In this example, the call-setup period ends and the ringback period begins when the ringback server 128 transmits the ringback media. However, as noted before, the transition between the call-setup and ringback periods may occur at another point, such as when the MSC 124 sends the call-setup message, receives the messages indicating that ringing is in progress, or signals to the ringback server 128 to transmit the ringback media.

The ringback server 128 may transmit the ringback media in any of a variety of ways. For example, the ringback server 128 may play the ringback media at a baseline amplitude level, encode the ringback media, and then transmit the encoded ringback media, for receipt by the client device 102. The ringback media may then be presented to the calling party at a baseline volume level that corresponds to the baseline amplitude level. In other examples where the PDSN 132 is mediating the call, for instance, the ringback media may be played at a baseline amplitude level, transmitted in the form of a packetized data message, and the client device 102 may interpret and play the ringback media at the baseline volume level.

Further, the ringback media may be presented to the calling party in any of a variety of forms. As examples, the presentation of ringback media may include audio and/or video streaming on a bearer channel or RTP connection. Of course, other examples exist for presenting the ringback media to the calling party.

Next, the called party may answer the call, and the client device 106 may signal to the MSC 124 that the call has been answered. The MSC 124 may in turn send a message to the ringback server 128 to stop transmission of the ringback media. The ringback server 128 may then stop transmission of the ringback media. In the case where the PDSN 132 is mediating the call and the ringback media was transmitted in the form of a packetized data message that was interpreted and played out by the client device 102, the message to stop transmission of the ringback media could instead be sent to the client device 102. When the ringback server 128 stops transmission of the ringback media or the client device 102 stops playing the ringback media, the ringback period may end. Of course, the ringback period may end at other points such as when the MSC 124 sends the message to stop transmission of the ringback media. At approximately the end of the ringback period, the MSC 124 may then signal to the client device 102 that the call has been answered, and the call may then proceed as usual.

5. Example of Setting a Volume Level of Ringback Media a. Overview

Figure 4:
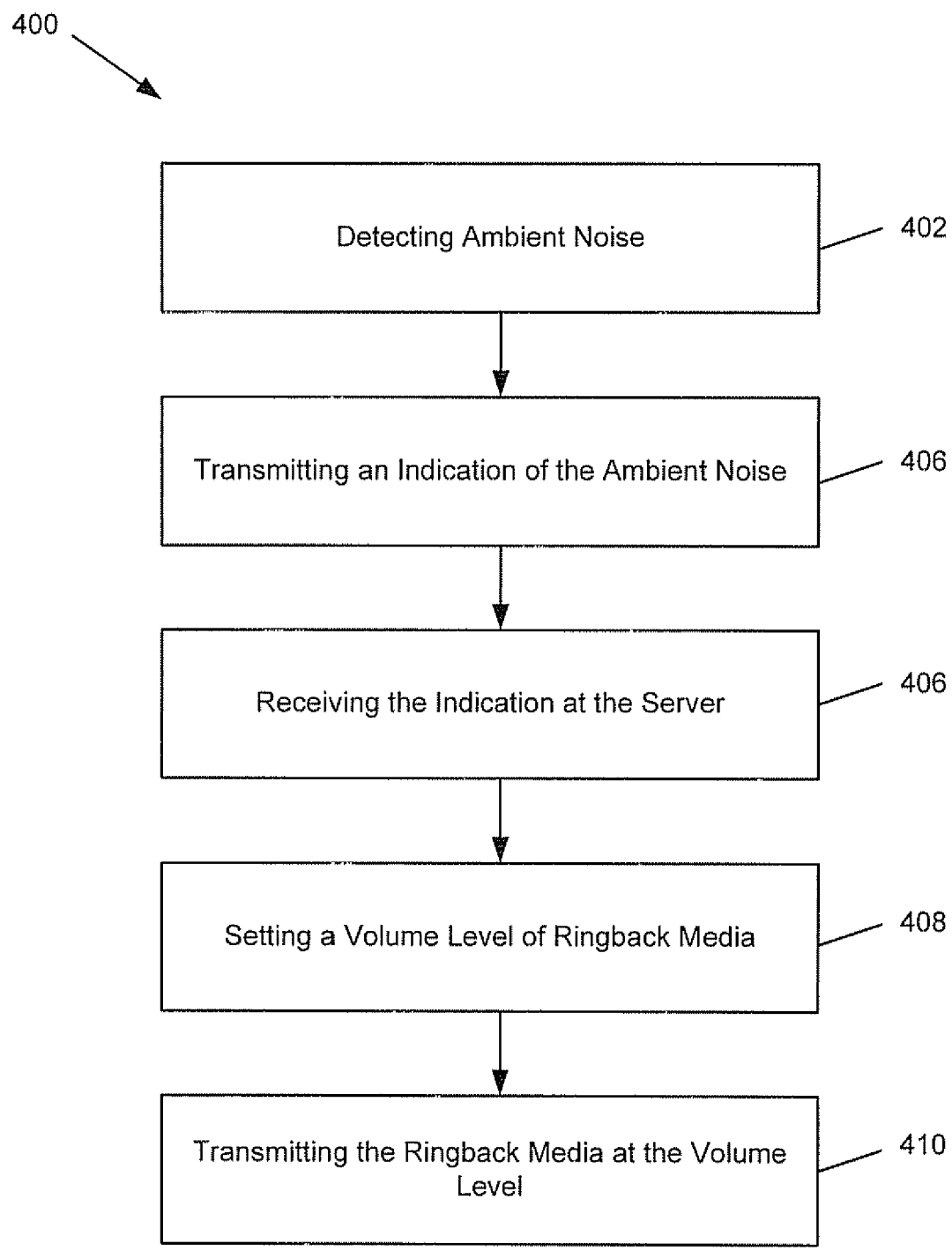
FIG. 4 is a flow chart provided to illustrate some of the functions that may be carried out in accordance with an embodiment of the present invention.

FIG. 4 is a flow chart of a method 400 for setting a volume level of ringback media presented to a client device. Two or more of the functions shown in FIG. 4 may occur substantially simultaneously. Further, not all of the functions shown in FIG. 4 are required in order to carry out the method 400.

In this example, the user of client device 102 ("calling party") is in an environment with ambient noise that may be either relatively high or low. In such an environment, the calling party sends a call request to the MSC 124, and the MSC 124 initiates a call-setup period for the call. At block 402, the method includes detecting ambient noise at the client device 102. At block 404, the method includes transmitting an indication of the ambient noise, for receipt by the ringback server 128. Next, at block 406, the method includes receiving the indication of the ambient noise at the ringback server 128. At block 408, the method includes using the received indication as a basis to set a volume level of ringback media. And at block 410, the method includes transmitting the ringback media at the volume level, for receipt by the client device 102 b. Method Steps i. Detecting Ambient Noise at the Client Device

At block 402, the method includes detecting ambient noise at the client device 102. Any of a variety of devices may detect the ambient noise at the client device 102. For instance, the client device 102 may detect the ambient noise. In particular, the user interface 304 of the client device 102 may include a microphone or other device arranged to detect sound vibrations, and the microphone or other device may detect the ambient noise. Alternatively, a dedicated microphone in close proximity to the client device 102 (e.g., within several feet) may detect the ambient noise. Of course, other examples exist for a device or devices detecting the ambient noise.

Generally speaking, the ambient or background noise is composed of sound vibrations. The sound vibrations may be produced by a single object or cooperatively produced by a number of objects. Further, the one or more objects producing the sound vibrations may be in close proximity to the client device 102 (e.g., within 10 feet) and/or farther away (e.g., more than 1 mile away). Detecting the ambient noise at the client device 102 may include detecting the sound vibrations within a given radius (e.g., 10 feet) of the client device 102. As an example, detecting the ambient noise may include detecting sound vibrations within a five-foot radius of the client device, the sound vibrations being cooperatively produced by a group of people that are 10 feet away from the client device 102 and by an airborne airplane that is approximately 2 miles away from the client device 102.

The client device 102 (assuming the client device 102 detects the ambient noise) may detect the ambient noise automatically, or in response to a user instruction or MSC 124 instruction, as examples. Further, the client device 102 may detect the ambient noise at any of a variety of points. As examples, the client device 102 may detect the ambient noise before the call-setup period begins (e.g., while the calling party is dialing the phone number corresponding to the client device 106 or just before sending the call request), at approximately the same time the call-period begins (i.e., while the client device 102 sends the call request), or after the call-setup period begins (i.e., after the client device 102 sends the call request). As another example, the client device 102 may detect the ambient noise after receiving from the MSC 124 an indication that the called party is a subscriber to ringback service. Preferably, the client device 102 detects the ambient noise before the ringback period begins.

The client device 102 may detect the ambient noise in any of a variety of ways. For example, the client device 102 may sample the ambient noise during a sampling period. The sampling period may begin at any of a variety of points. As examples, the sampling period may begin before the call-setup period begins, at approximately the same time the call-setup period begins, or after the call-setup period begins. Further, the sampling period may last for any of a variety of time periods. As examples, call-setup period may be a predetermined period of time (e.g., 1 second), a period of time coinciding with the call-setup period, or a period of time coinciding with a portion of the call-setup period. Of course, other examples exist for the sampling period, and for detecting the ambient noise.

After detecting the ambient noise, the client device 102 may assign a value or indication to the ambient noise. The indication may take any of a variety of forms. As an example, the indication may be a numerical value such as a decibel level, amplitude level, or a scaled number. The scaled number, for instance, may be a number that ranges from 1 to 10, with 1 indicating a relatively low ambient noise level and 10 indicating a relatively high ambient noise level.

As another example, the indication may be a letter or other symbol. The letter, for instance, may be a letter in an alphabetical sequence that begins with the letter "A" and ends at the letter "E", with "A" indicating a relatively low ambient noise level and "E" indicating a relatively high ambient noise level. As yet another example, the indication may be a Boolean value indicating whether the ambient noise exceeds (is greater than or less than) a predefined threshold level. Further, the indication corresponding to the ambient noise may be an average value taken over the sampling period or a peak value. Of course, other examples exist for the indication of the ambient noise.

ii. Transmitting an Indication of Ambient Noise

At block 404, the method includes transmitting the indication of the ambient noise, for receipt by the ringback server 128. Any of a variety of devices may transmit the indication of the ambient noise, such as the client device 102, a dedicated transmitter, or another device altogether. Of course, other examples exist for a device or devices transmitting the indication of the ambient noise.

The client device 102 (assuming the client device 102 transmits the indication of the ambient noise) may transmit the indication automatically after detecting the ambient noise, or in response to a user instruction or MSC 124 instruction, as examples. Further, the client device 102 may transmit the indication of the ambient noise at any of a variety of points after detecting the ambient noise. As examples, the client device 102 may transmit the indication of the ambient noise before the call-setup period begins (e.g., while the calling party is dialing the phone number corresponding to the client device 106 or just before sending the call request), at approximately the same time the call-period begins (i.e., while the client device 102 sends the call request), or after the call-setup period begins (i.e., after the client device 102 sends the call request). Preferably, the client device 102 transmits the indication of the ambient noise before the ringback period begins.

The client device 102 may transmit the indication of the ambient noise to any of a variety of devices. For example, the client device 102 may transmit the indication of the ambient noise to the MSC 124 (e.g., together with the dialed telephone number or in another signaling message), and the MSC 124 may forward the indication or transmit a modified version of the indication to the ringback server 128 once the MSC 124 establishes a communication session between the MSC 124 and ringback server 128. Alternatively, if a ringback session is already established between the client device 102 and ringback server 128, the client device 102 may transmit the indication of the ambient noise directly to the ringback server 128 (i.e., to a network address corresponding to the ringback server 128).

iii. Receiving an Indication of Ambient Noise

At block 406, the method includes receiving the indication of the ambient noise at the ringback server 128. The ringback server 128 may receive the indication of the ambient noise at any of a variety of points after the client device 102 transmits the indication. As examples, the ringback server 128 may receive the indication during the call-setup period, at approximately the end of the call-setup period, or at approximately the beginning of the ringback period (e.g., just before transmission of the ringback media). Generally, the ringback server 128 receives the indication of the ambient noise once a communication session is established between the MSC 124 and the ringback server 128 and/or once a ringback session is established between the client device 102 and ringback server 128.

iv. Using the Indication as a Basis to Set a Volume Level of the Ringback Media

At block 408, the ringback server 128 uses the received indication as a basis to set a volume level of the ringback media. The ringback server 128 may use the received indication as a basis to set a volume level of the ringback media in any of a variety of ways.

Figure 5:
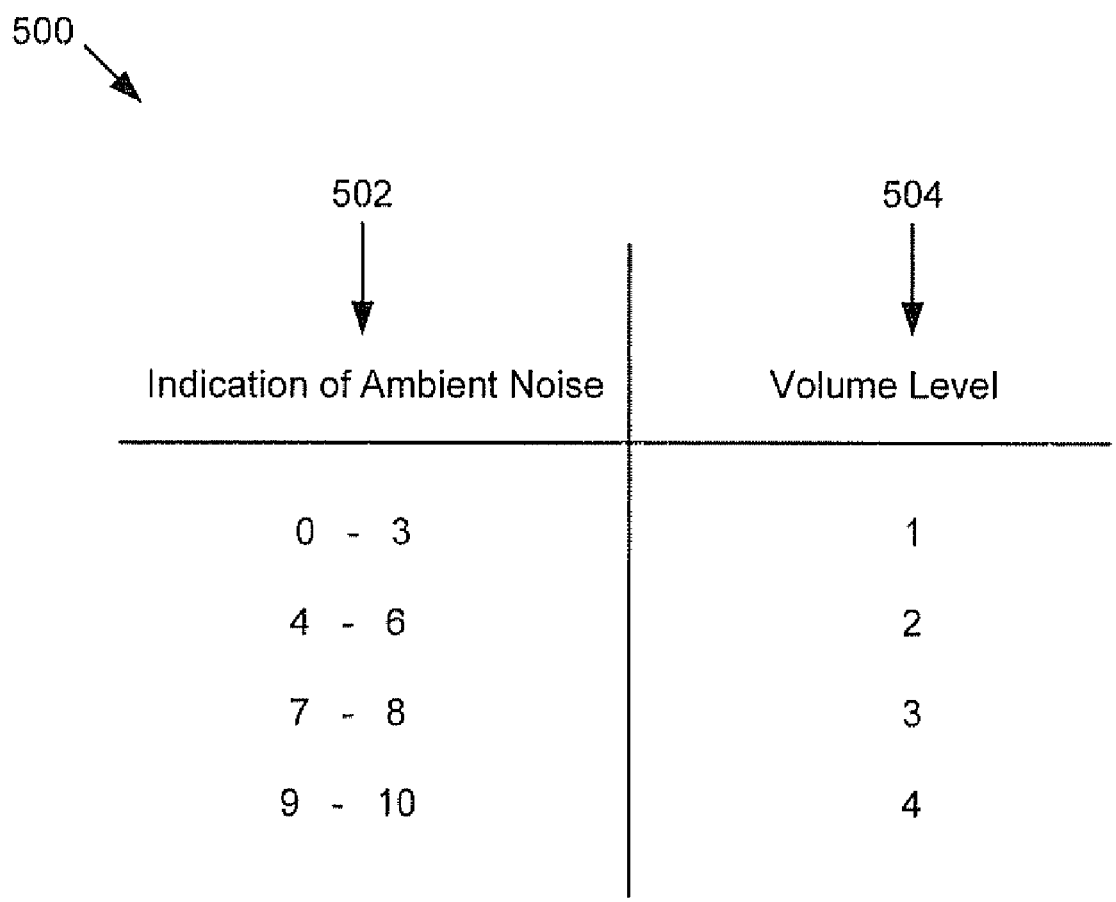
FIG. 5 is a block diagram of a correlation data table for use in carrying out an embodiment of the present invention.

For instance, the ringback server 128 may first use the received indication to determine a volume level for the ringback media. By way of example, the ringback server 128 may store correlation data and use the data to correlate indications of ambient noise to corresponding volume levels. To illustrate, FIG. 5 is a correlation data table 500 for use in carrying out an embodiment of the present invention. As shown in FIG. 5, the table 500 includes columns 502 and 504. Column 502 includes various ranges of scaled numbers, with each scaled number corresponding to an indication of the ambient noise. And column 504 includes corresponding volume levels for each range. If, for example, the indication of the ambient noise is equal to a scaled number of "8," then the ringback server 128 may determine that the volume level for the ringback media is "1." Of course, other examples exist for the correlation data table 500, and for using the received indication to determine a volume level for the ringback media.

Once ringback server 128 determines a volume level for the ringback media, the ringback server 128 may then set the volume level of the ringback media to the determined volume level. The ringback server 128 may set the volume level of the ringback media in any of a variety of ways. For example, the ringback server 128 may set an amplitude level of the ringback media, and the amplitude level may correspond to the determined volume level. For instance, if the ringback server 128 determines that the volume level of the ringback media should be set to "4", then the ringback server 128 may set the ringback media to an amplitude level that corresponds to the determined volume level. Alternatively, if the ringback server 128 plays the ringback media at a baseline amplitude level, then the ringback server 128 may set the volume level of the ringback media by adjusting (e.g., increasing or decreasing) the baseline amplitude level of the ringback media to a level corresponding to the determined volume level. Of course, other examples exist for setting the volume level of the ringback media.

Further, the ringback server 128 may set the volume level of the ringback media at any of a variety of points after receiving the indication of the amplitude level. As examples, the ringback server 128 may set the volume level during the call-setup period, at approximately the end of the call-setup period, at approximately the beginning of the ringback period (e.g., just before transmission of the ringback media), or during the ringback period during transmission of the ringback media).

v. Transmitting the Ringback Media at the Volume Level

At block 410, the ringback server 128 transmits the ringback media at the volume level, for receipt by the client device 102. In the case where the ringback server 128 sets the volume level of the ringback media during transmission, the ringback server 128 may play the ringback media at the set or adjusted amplitude level, encode the ringback media, and then transmit the encoded ringback media. Alternatively, the ringback server 128 may first encode the ringback media, set or adjust the amplitude level of the encoded ringback media, and then transmit the encoded ringback media.

Further, the ringback server 128 may transmit the ringback media to the MSC 124, and the MSC 124 may transmit the ringback media to the client device 102. Alternatively, the ringback server 128 may transmit the ringback media directly to the client device 102 (i.e., to a network address corresponding to the client device 102). Of course, other examples exist for transmitting the ringback media at the volume level.

5. Conclusion

Methods and systems have been disclosed for setting a volume level of ringback media presented to a calling party. By using the indication of ambient noise at the client device as a basis to set a volume level of the ringback media, the ringback media is preferably presented to the calling party at a desirable volume level. For instance, if the calling party is in an environment with relatively high ambient noise, then the ringback media is preferably presented at a volume level that is audible to a calling party. If on the other hand, the calling party is in an environment with relatively low ambient noise (e.g., in a relatively quiet environment), then the ringback media is preferably presented at a volume level that is appropriate for the relatively quiet environment.

Exemplary embodiments of the present invention have been described above. Those skilled in the art will understand, however, that changes and modifications may be made to the embodiments described without departing from the true scope and spirit of the present invention, which is defined by the claims.

The invention claimed is:

1. In a server that transmits media content to a client device, a method comprising:
   receiving at the server an indication of ambient noise at the client device;
   using the received indication as a basis to set a volume level of the media content; and
   transmitting the media content at the volume level, for receipt by the client device,
   wherein a call placed by the client device includes a call-setup period and ringback period, wherein receiving the indication of the ambient noise comprises receiving the indication during the call-setup period, and wherein transmitting the media content comprises transmitting the media content during the ringback period.

2. The method of claim 1, wherein setting the volume level of the media content comprises setting the volume level during the call-setup period.

3. The method of claim 1, wherein setting the volume level of the media content comprises setting the volume level during the ringback period.

4. The method of claim 1, wherein using the received indication as a basis to set the volume level of the media content comprises using correlation data to correlate the indication of the ambient noise to the volume level, thereby determining the volume level for the media content.

5. The method of claim 4, wherein using the received indication as a basis to set the volume level further comprises setting the volume level of the media content to the determined volume level.

6. The method of claim 1, wherein setting the volume level of the media content comprises setting an amplitude level of the media content.

7. The method of claim 1, wherein setting the volume level of the media content comprises adjusting an amplitude level of the media content.

8. The method of claim 1, wherein the client device is a wireless communication device, and wherein transmitting the media content comprises transmitting the media content to the client device via a wireless communication link.

9. A server comprising:
   a communication interface;
   a processor; and
   data storage containing (i) media content and (ii) instructions executable by the processor to:
      receive an indication of ambient noise at a client device,
      use the received indication as a basis to set a volume level of the media content, and
      transmit the media content at the volume level via the communication interface, for receipt by the client device,
   wherein a call placed by the client device includes a call-setup period and ringback period, wherein the instructions to receive the indication of the ambient noise comprise instructions to receive the indication during the call-setup period, and wherein the instructions to transmit the media content at the volume level comprise instructions to transmit the media content during the ringback period.

10. The server of claim 9, wherein the instructions to set the volume level of the media content comprise instructions to set the volume level of the media content during the call-setup period.

11. The server of claim 9, wherein the instructions to set the volume level of the media content comprise instructions to set the volume level of the media content during the ringback period.

12. The server of claim 9, wherein the data storage contains correlation data, and wherein the instructions to use the received indication as a basis to set the volume level of the media content comprise instructions to use the correlation data to correlate the indication of the ambient noise to the volume level.

13. The server of claim 9, wherein the instructions to set the volume level of the media content comprise instructions to set an amplitude level of the media content.

14. The server of claim 9, wherein the instructions to set the volume level of the media content comprise instructions to adjust an amplitude level of the media content.

15. A system comprising:
a client device; and
a ringback server,
wherein the client device is arranged to (i) detect ambient noise, and (ii) transmit an indication of the ambient noise, for receipt by the ringback server, and
wherein the ringback server is arranged to (i) receive the indication of the ambient noise, (ii) use the received indication as a basis to set a volume level of ringback media, and (iii) transmit the ringback media at the volume level, for receipt by the client device.

16. The method of claim 1, wherein receiving the indication of the ambient noise comprises receiving a numerical value corresponding to the ambient noise, and wherein using the received indication as a basis to set the volume level comprises using the numerical value as a basis to set the volume level.

17. The server of claim 9, wherein the instructions to receive the indication of the ambient noise comprise instructions to receive a numerical value corresponding to the ambient noise, and wherein the instructions to use the received indication as a basis to set the volume level comprise instructions to use the numerical value as a basis to set the volume level.

* * * * *